Jan. 28, 1947. G. H. REID ET AL 2,414,977
OPTICAL PROJECTION APPARATUS
Filed Feb. 27, 1945 3 Sheets-Sheet 2

Inventor
George Hancock Reid
Nichter Gordon Heath Cantle
By
Stevens and Davis
their Attorneys Jan. 28, 1947.    G. H. REID ET AL    2,414,977
OPTICAL PROJECTION APPARATUS
Filed Feb. 27, 1945    3 Sheets—Sheet 3
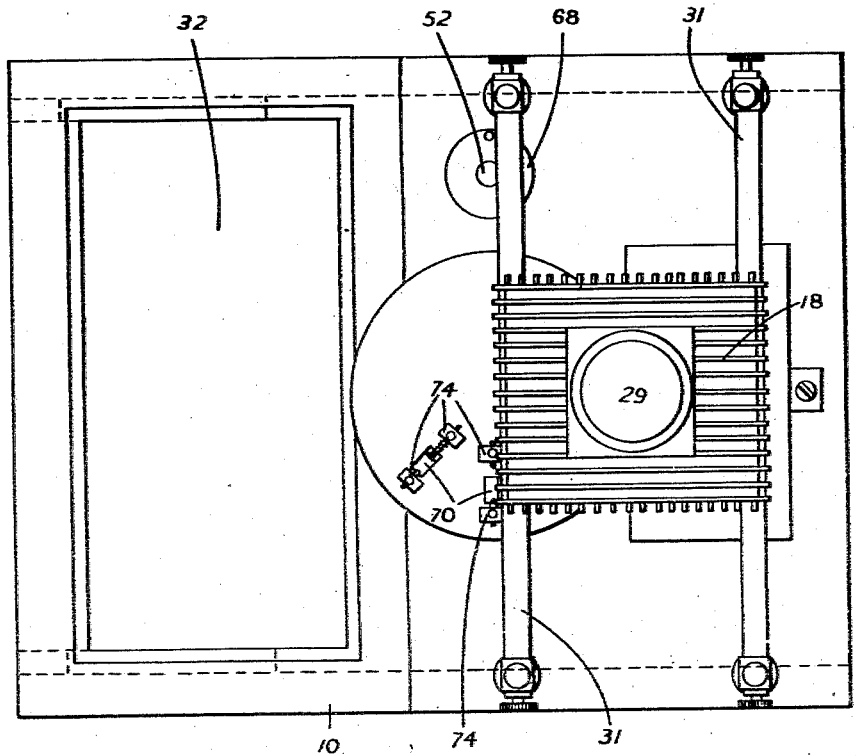
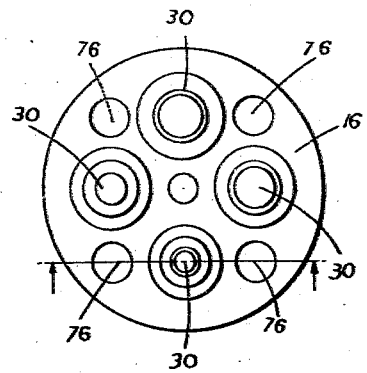
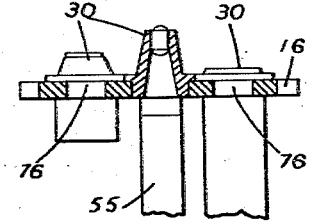

Patented Jan. 28, 1947

2,414,977

UNITED STATES PATENT OFFICE 2,414,977

OPTICAL PROJECTION APPARATUS

George Hancock Reid, Kirby Muxloe, near Leicester, and Leicester Gordon Heath Cantle, St. Marks Hill, Surbiton, England, assignors to Reid and Sigrist Limited, Kirby Muxloe, near Leicester, England Application February 27, 1945, Serial No. 579,938
In Great Britain October 7, 1943

1 Claim. (Cl. 88—24)

This invention relates to optical projection apparatus of the kind used for projecting an enlarged image of an opaque object on to a screen by means of an objective lens for the purpose of inspection or measurement.

It is well known that in optical projectors of the above kind the enlarged image of the object is projected on to the screen forming part of the casing of the projector. The source of light is enclosed in a box which keeps in all the light except that which forms the image on the screen. The emitted light passes through a magnifying lens system or objective lens on to the screen. It is also known that an optical projector of the above kind may be used to project either the image of an illuminated surface of the object or the silhouette of the object.

It is an object of the present invention to provide an improved optical projector of the above kind which is arranged so that both the object and the objective lens can be quickly and easily changed.

According to a feature of the present invention an optical projector comprising a source of light and an objective lens system for projecting an image of an opaque object on to a screen is provided with a rotatable disc or like member for supporting a plurality of objects, and a second rotatable member or turret supporting a plurality of objective lenses, said rotatable members being arranged so that any one of the objects may be brought into operative relationship with any one of the objective lenses and with a source of light.

According to a further feature of the invention an optical projector comprises a source of light and an objective lens for projecting an image of an opaque object on to a screen is provided with lever mechanism for adjusting the position of the object relative to the objective lens so that the image of the object can be focussed.

Preferably the apparatus is arranged so that either an illuminated surface or the silhouette of the object may be projected on to the screen.

According to a further feature of the invention an optical projector comprising a lamp box containing a source of light for illuminating the surface of an object and an objective lens system for projecting an image of said illuminated surface on to a screen, is provided with ventilating means for permitting the circulation of air through said lamp box without allowing the passage of light through said means.

According to a further feature of the invention an optical projector comprises a source of light, an objective lens system and an adjustably mounted reflector for projecting an image of an opaque object on to a screen.

Referring to the accompanying drawings:

Figure 3 is a plan of the apparatus;

Figure 4 is a detail view in plan; and

Figure 5 is a side elevation of Figure 4.

Figure 1:
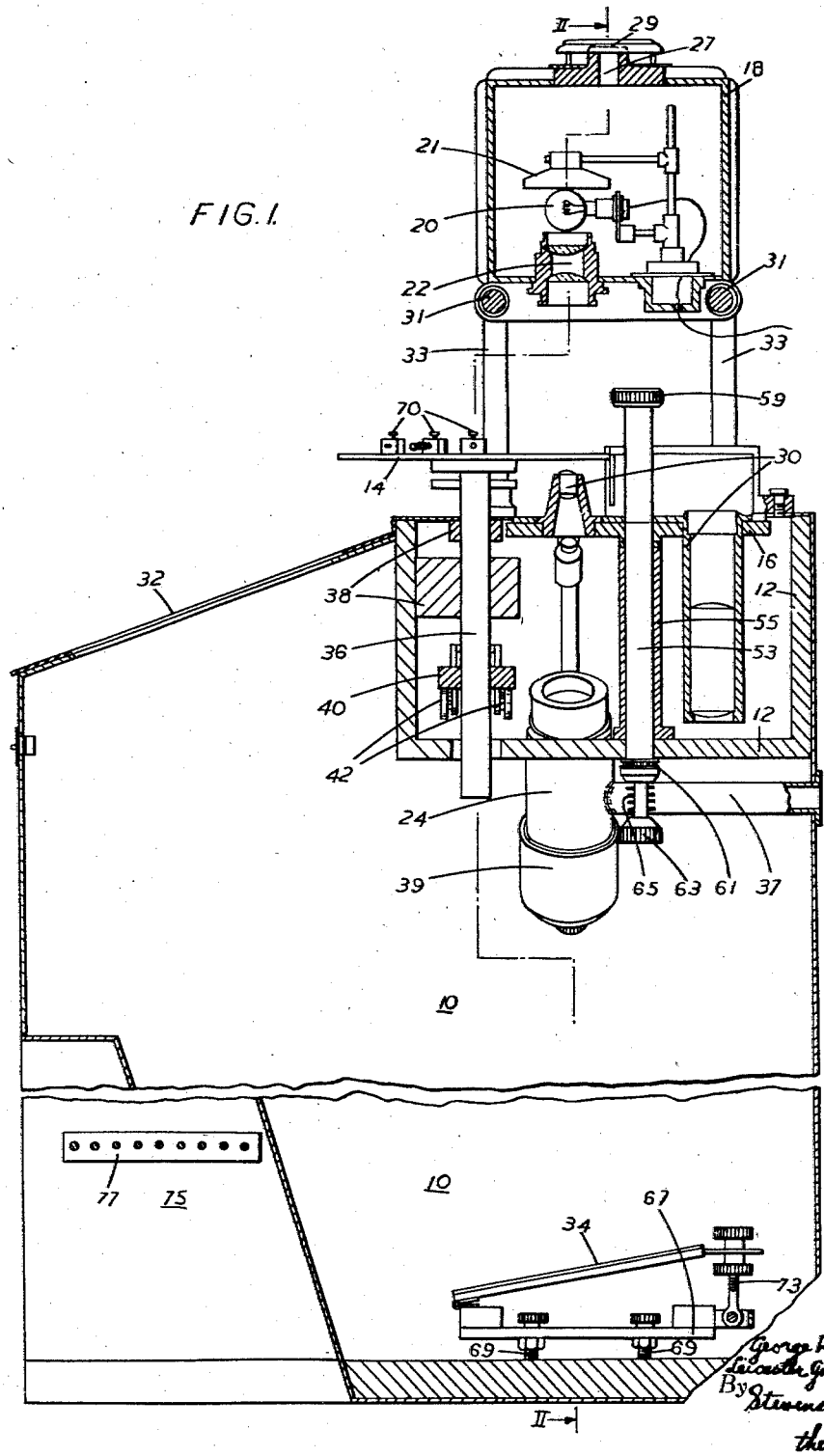
Figure 1 is a side elevation in section of an optical projector according to this invention.

A sheet metal casing 10 carries in its upper portion a rigid frame 12 which supports a rotatable disc 14 on which a number of objects or specimens can be mounted and a rotatable turret 16 carrying a number of objective lenses of different focal length. Surmounting the frame 12 is a lamp house 18 in which a lamp 20 and a condensing lens 22 for illuminating the objects or specimens carried by the rotatable disc 14 when these are to be projected in silhouette. Within the casing are two lamp housings 24 each having a lamp 26 and a condenser lens 28 for illuminating the underside of objects to be projected under surface illumination. One or other of the objective lenses 30 carried by the turret 16 projects an image of one of the objects on to a translucent screen 32 in the front part of the top of the casing 10, the light being reflected upwardly and forwardly by a mirror 34 adjustably mounted in the bottom of the casing 10 and the translucent screen 32 being suitably inclined as shown in Figure 1 so that the image formed by the objective lens 30 is in focus throughout the area of the screen.

The various objective lenses 30 are arranged at different heights as clearly shown in Figure 1 in accordance with their varying focal lengths. It is, however, necessary to provide an adjustment for bringing the projected images of the various objects into correct focus on the screen 32 and it is effected, as will be described hereinafter, by a vertical movement of the disc 14.

Figure 2:
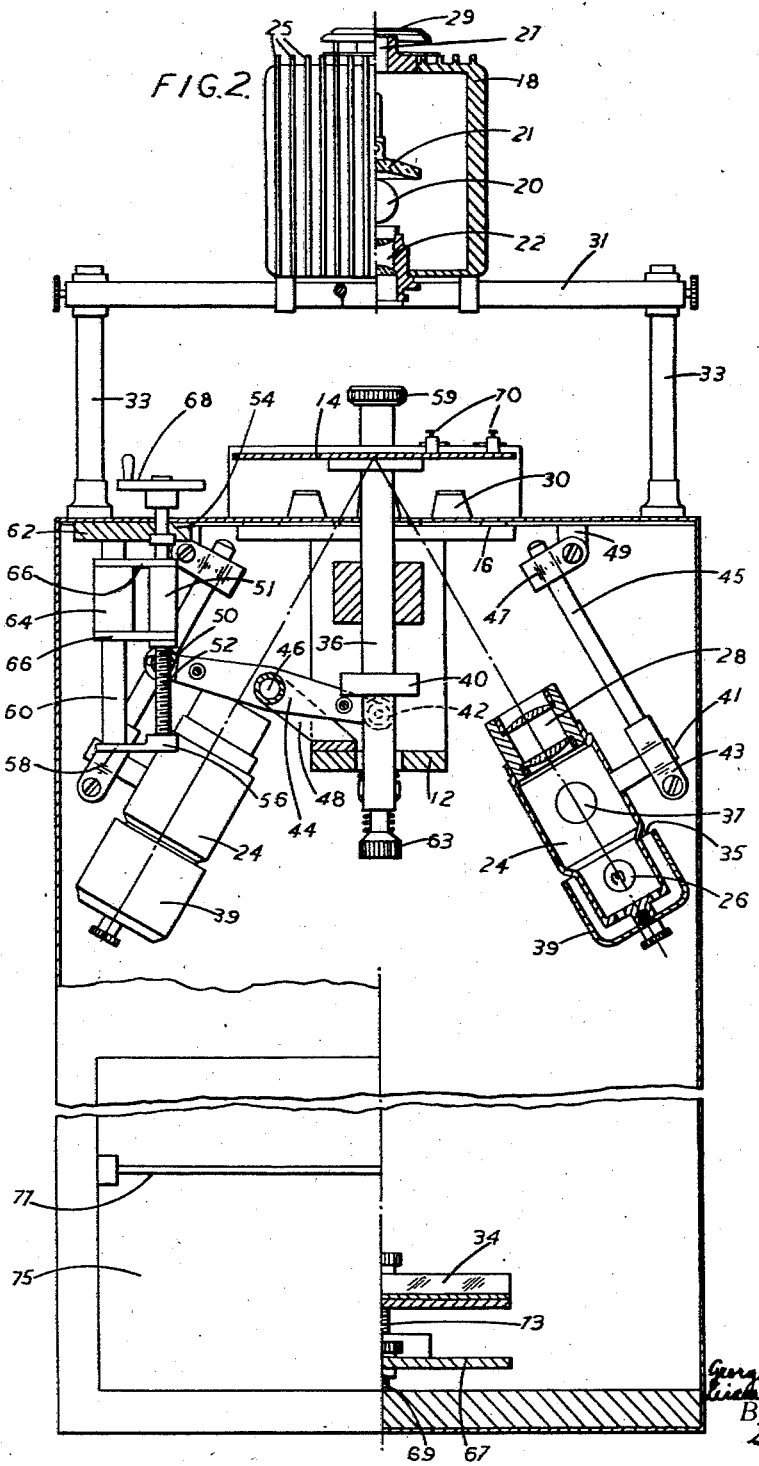
Figure 2 is a front elevation of the apparatus partly in section on the line II—II in Figure 1.

This disc is secured to the upper end of a vertical spindle 36 mounted to rotate and slide in bearings 38. Secured to the spindle 36 is a collar 40 which rests upon the outer races of two ball bearings 42 serving as rollers, these rollers being carried at one end of a forked lever 44 (Figure 2) centrally pivoted at 46 to a bracket 48 carried by the frame 12. The other end of the lever carries another pair of ball-bearing rollers 50 bearing against the underside of a nut 51 through which extends a vertical screw-threaded spindle 52. This spindle is carried in an upper bearing 54 at the top of the casing 10 and a lower bearing 56 in a plate 58 secured to the lower end of a vertical guide-rod 60. This guide-rod is secured at its upper end in a plate 62 fixed in the top of the casing 10 and also carrying the bearing 54. A guide sleeve 64 slides on the guide-rod 60 and is fixed to the nut 51 by means of lugs 66. Thus the nut 51 is held against rotation and guided in a vertical path.

The upper end of the spindle 52 carries a hand-wheel 68 by which the spindle can be rotated to cause the nut 51 to travel up or down, the motion of the nut being communicated without backlash to the spindle 36 which carries the disc 14 on which objects to be examined are mounted. Thus the image on the screen 32 of any of these objects can be brought into sharp focus, whichever of the objective lenses 30 is in use.

The disc 14 overlaps the turret 16 as shown in Figure 5. By rotating the disc 14 and the turret 16 any one of the lenses 30 and any one of the apertures 70 can be brought into alignment with the condensing lens 22 so that light from the lamp 20 passes through the aperture 70, the lens 30 and an aperture 72 in the frame 12 on its way to the mirror 34. The disc 14 is provided with a number of radially disposed clamping devices 74, one for each aperture 70, by means of which objects to be inspected can be clamped to the disc immediately above the aperture 70.

There are four objective lenses 30 arranged at intervals of 90° as shown in Figure 4 and the turret 16 is formed with four holes 76 at the corners of a square with the axes of the four lenses 30 at the mid points of the sides of the square. It will be apparent, therefore, from a comparison of Figures 1, 4 and 5 that when any one of the objective lenses 30 is in alignment with the condensing lens 22 it will be flanked by two of the holes 76 the centres of which are situated on a line perpendicular to the paper. These two holes allow light from the lamps 26 to shine upon the underside of an object carried by the plate 14. When an object is thus illuminated (the lamp 20 being extinguished) an image of the surface of the object is visible upon the screen 32.

The lamp 20 is surmounted by a concave mirror 21 and is situated in a lamp housing 18 formed with external ribs 25 to facilitate the dissipation of heat from the housing. An air outlet 27 is provided in the top of the housing 18 and this outlet is surmounted by a metal plate 29 flanged downwardly at its margin to minimise the escape of light from the housing.

The condensing lens 22 is mounted in the lower side of the housing 18, which is supported on a pair of horizontal bars 31 carried by standards 33 secured to the top of the casing 10.

The lower end of each of the lamp housings 24 is formed with a ring of holes 35 for the admission of air, hot air escaping through exhaust conduits 37 discharging the heated air outside the casing 10. Attached to the lower end of the lamp housing is a cup-shaped light trap 39 which is spaced away from the sides of the housing and thus allows air to enter the housing through the holes 35 while preventing the escape of light through these holes. Each lamp housing 24 is provided with an arm 41 secured in a clamp 43 at the lower end of a rod 45 carried by a lug 47 adjustably mounted in a bracket 49 secured to the inside of the top of the casing 10. By these means the lamp housings can be adjusted angularly so that the light from the lamps 26 focussed by the condensers 28 can be directed upon the underside of the object carried by the disc 14 when this object is in alignment with the condensing lens 22 and the objective lens 30 in use.

The turret 16 is secured to a spindle 53 mounted to rotate in a bearing sleeve 55 carried by the frame 12. The spindle carries a thrust collar 57 which rests on the upper end of the bearing sleeve 55. The spindle extends upwardly from the turret 16 and is formed at its upper end with a knob 59 by means of which the turret can be manually rotated. The lower end of the spindle extends downwardly through the lower member of the frame 12 in which it is mounted in a ball bearing 61 and terminates in a collar or bush 63. A spring 65 is provided between the collar or bush 63 and the ball bearing 61 to maintain the spindle and supporting disc resiliently in position on the vertical bearing.

The mirror 34 is hinged to a supporting frame 67 which can be raised or lowered by means of screws 69 attached to the base plate 71 of the casing 10. The angle between the mirror 34 and the supporting frame 67 can be adjusted by means of a fine pitch screw 73.

The casing 10 is provided at the front with a compartment 75 within which is a rack 77 for spare parts of the apparatus such as lenses, lamps and the like. The screen 32 may be marked with scale divisions and the like in known manner.

What we claim is:

Optical projection apparatus comprising a rotatable disc provided with a plurality of spaced translucent areas equidistant from the axis of rotation, means for supporting objects in said areas for image projection, a light source located above said disc, a condenser lens system for focussing light from said source on one portion of said disc that lies the same distance from its axis of rotation as the translucent areas so that by rotation of the disc any of the objects may be lighted from said source, a second light source located below said disc, a second condenser lens system for focussing the light from said second source on said one portion of said disc, a rotatable lens turret located between said disc and said second condenser lens system, a plurality of objective lenses mounted on said turret for selective vertical registry with said one portion of said disc, said turret having a translucent portion so located with respect to each lens as to register with the light path between said second condenser system and said one portion of said disc when the respective lens is in vertical registry with said one portion of said disc, a viewing screen, means for directing the light passing through the objective lens to said screen, a shaft supporting said disc for rotation, a thrust collar on said shaft, a lever, means for pivotally supporting said lever intermediate its ends, one end of the lever bearing upwards against the thrust collar, and screw driven means pressing the other end of the lever downwards to raise the said shaft and disc.

GEORGE HANCOCK REID.
LEICESTER GORDON HEATH CANTLE.